L. W. STOCKWELL.
Expansion-Tap.
No. 227,394. Patented May 11, 1880.
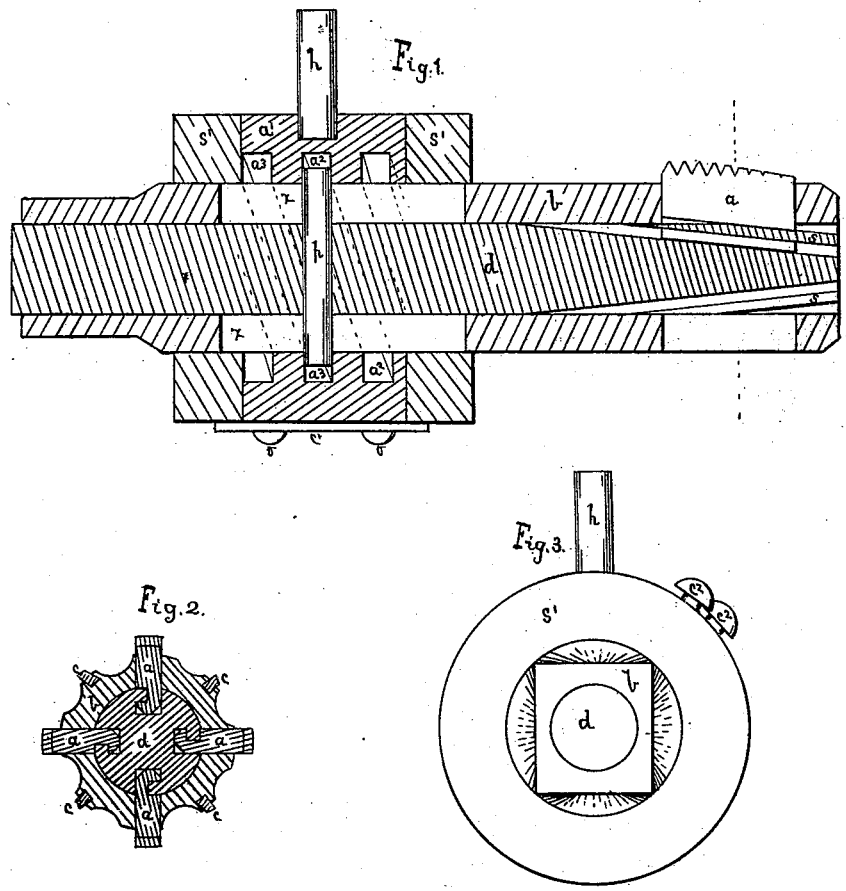

UNITED STATES PATENT OFFICE.

LEVI W. STOCKWELL, OF CLEVELAND, OHIO.

EXPANSION-TAP.

SPECIFICATION forming part of Letters Patent No. 227,394, dated May 11, 1880.

Application filed November 18, 1878.

*To all whom it may concern:*

Be it known that I, LEVI W. STOCKWELL, of Cleveland, Ohio, have invented a new and useful Improvement in Expansion-Taps, of which the following is a specification.

The invention relates to that class of taps in which the threading-dies are movable in the stock.

The object of my invention is to expand and contract the tap by adjusting the threading-dies in a hollow stock by means of an arbor having inclined sides in contact with the dies.

In the drawings, Figure 1 is a longitudinal section. Fig. 2 is a cross-section at the dotted line in Fig. 1. Fig. 3 is an end view.

The dies $a\ a\ a\ a$ are placed in slots in the hollow stock $b$, which is cut away on its circumference at the sides of each die to allow the cuttings to escape.

Reamers $c\ c\ c\ c$ are firmly inserted in grooves in the circumference and lengthwise of the stock between the dies, to ream the nut before threading it.

The arbor $d$ in the hollow stock $b$ has recessed inclined grooves $s\ s\ s\ s$ in its circumference, near its front end, and the inner edges of dies $a$ are inclined, and one side of the die is grooved to conform to the recessed groove $s$ in arbor $d$.

The collar $a'$ on stock $b$ has inside cam-grooves $a^2\ a^3$ in the form of screw-threads.

The pin $p$ rests in a hole through arbor $d$ and in slots $x\ x$ in hollow stock $b$, the ends of the pin entering the cam-grooves $a^2\ a^3$.

Collars $s'\ s'$ are fastened to stock $b$, in contact with each side of cam-collar $a'$, by set-screws $c^2\ c^2$ extending through collars $s'\ s'$, in contact with stock $b$, so as to allow collar $a'$ to be turned on stock $b$, but preventing it from moving lengthwise of the stock.

The handle $h$ is inserted in a hole in cam-collar $a'$ to turn. By turning cam-collar $a'$ the arbor $d$ is forced backward and forward in stock $b$ to expand and contract the tap.

The cam-collar $a'$ may be adjusted on stock $b$ to obtain a greater expansion or contraction of the tap by changing the position of collars $s'\ s'$ on stock $b$.

When the dies are properly adjusted collar $a'$ is held in its position by turning screws $o\ o$ so as to press clamp $c'$, which rests across cam-collar $a'$ on collars $s'\ s'$.

I claim as my invention—

1. The adjustable collars $s'\ s'$, in combination with cam-collar $a'$, arbor $d$, dies $a$, and stock $b$, substantially as described.

2. The cam-collar $a'$, in combination with clamp $c'$, collars $s'\ s'$, arbor $d$, stock $b$, and dies $a$, substantially as described.

LEVI W. STOCKWELL.

Witnesses:
A. C. HORD,
JNO. C. GRANNIS.